United States Patent [19]

Hunziker, Jr.

[11] 3,902,459

[45] Sept. 2, 1975

[54] MOUSE FEEDING SYSTEM

[75] Inventor: John Hunziker, Jr., Pine Bluff, Ark.

[73] Assignee: The United States of America as represented by the Secretary of the Department of Health, Education, and Welfare, Washington, D.C.

[22] Filed: Apr. 25, 1974

[21] Appl. No.: 464,489

[52] U.S. Cl. .............................. 119/52 R; 119/18
[51] Int. Cl. ............................................. A01k 5/00
[58] Field of Search ............... 119/52 R, 51 FS, 18

[56] References Cited
UNITED STATES PATENTS

| | | | |
|---|---|---|---|
| 815,625 | 3/1906 | Nottage | 119/52 R |
| 963,968 | 7/1910 | Whitney | 119/52 R |
| 1,029,660 | 6/1912 | Blanchett | 119/52 R |
| 1,128,971 | 2/1915 | Graham | 119/52 R |
| 1,836,488 | 12/1931 | Munson | 119/52 R |

Primary Examiner—Hugh R. Chamblee

[57] ABSTRACT

A feed hopper for the cage of a mouse or other experimental animal comprises a feed chamber for holding a quantity of the feed having in cross-section an open top, a front wall, a rear wall substantially parallel thereto and first and second downwardly convergently angled guide walls attached to said front and rear walls, respectively, wherein said first and second guide walls define an outlet opening for gravitationally flowing the feed therethrough in a non-bridging manner. A screen covered trough or pan is positioned a predetermined distance below the outlet opening for receiving a small portion of the feed from the feed chamber. The mouse feeds by passing his tongue through the screen to pick up the food particles therebelow. The hopper also includes an animal deflector plate for preventing the animal from getting anything more than its head over the screen covered trough or pan.

12 Claims, 4 Drawing Figures

MOUSE FEEDING SYSTEM

FIELD OF THE INVENTION

The present invention relates to a feed hopper for laboratory animals which are used for experimental purposes and, more pertinently, to such a device which restricts the entry of the animal into the feeder. caused

BACKGROUND OF THE INVENTION

Experimental animals are used in various studies of diseases, and the effects of experimental diets, drugs, and other treatments designed for the benefit of mankind. It is highly desirable in evaluating the effects of drugs, diet and the like, to eliminate errors and the possibility of misleading results caused by reason of the experimental animals urinating or defecating into their food, and thereby reingesting the drugs or foods or metabolites thereof, normally excreted in the urine or feces.

Furthermore, current trends in toxicology and safety evaluation concerning modern drugs and preparations have necessitated an increase in long-term feeding studies of laboratory animals undergoing tests and observations. It has been determined that long-term feeding experiments, in order to produce valid and reliable results relating to food consumption, must be conducted under extremely careful feeding conditions.

Of utmost importance is the elimination of food contamination that will occur if the animal is permitted access to food which has been exposed to animal excretions. In many instances, an animal may obtain an overdose of a drug fed to it by eating food contaminated by fecal matter or urine carrying some percentage of the original dosage, thereby inducing false test results and inaccurate observations and calculations. Moreover, in long-term feeding studies, it is essential to determine exact food consumption, without losses due to spillage, while maintaining conditions of utmost cleanliness.

The early prior art feeders either permitted feed to be spilled and mixed with the bedding of the animal or permitted fecal matter to contaminate the feed. Later feeders, such as disclosed in U.S. Pat. Nos. 3,114,350 and 3,505,977, have attempted to overcome these disadvantages. Although successful, such devices have necessitated the utilization of articulated screen structures or other functionally similar structures. More particularly, such prior art devices are incapable of operating in conjunction with a gravitational feeder.

SUMMARY OF THE INVENTION

A principal object of the present invention is to overcome the defects of the prior art, as indicated above.

Another object of the present invention is to provide an improved feeding system for laboratory animals.

Another object is to provide a mouse feeding system which permits little or no spillage of feed, thereby permitting accurate measurement of the feed consumed.

Yet another object of the present invention is to avoid contamination of the feed with feces or urine.

In furtherance of these and other objects, a principal feature of the instant invention is a feeding system which makes available to the animal only a small quantity of feed and which offers it to the animal in such a manner that he is only able to eat it. Another feature is that the feeder utilizes a ground feed which flows in a non-bridging manner and which is presented to the animal under a stainless steel screen. Yet another feature is that the animal feeds by passing his tongue through the screen to pick up the food particles, thereby resulting in little or no spillage.

The feeding system of the instant invention is characterized by having a feed chamber for holding a quantity of feed comprising in cross-section an open top, a front wall, a rear wall substantially parallel thereto and first and second downwardly convergently angled guide walls attached to said front and rear walls, respectively, wherein said first and second guide walls define an outlet for gravitationally flowing the feed therethrough in a non-bridging manner. A screen covered trough or pan is positioned a predetermined distance below the outlet for receiving a small portion of the feed from the feed chamber. The trough or pan having in cross-section a substantially vertical side wall positioned in a plane between the first guide wall and the front wall, wherein the side wall of the trough or pan and the first guide wall define an animal access opening. More particularly, an animal shield or deflector extends outwardly and upwardly from the lower portion of the side wall of the trough for preventing the animal from getting anything more than its head over the screen covered portion of the trough.

For a better understanding of the invention, possible embodiments thereof will now be described with reference to the attached drawing, it being understood that the embodiments are intended to be merely exemplary and in no way limitative.

DETAILED DESCRIPTION

In preliminary investigations, it was determined that ground mouse feed which is screened through U.S. Testing Sieves Nos. 16–35 (0.0469 inch opening through 0.0197 inch opening) with as much as 8 percent fines (i.e., material passing through the No. 35 Sieve) added back, would not bridge when flowing through a 45° funnel and a four inch long throat having a 0.5 inch inside diameter. Further testing indicated that utilization of ground feed capable of passing through a No. 25 Sieve (0.0278 inch opening) but not a No. 35 Sieve (0.0197 inch opening) would result in lower spillage losses. After adding as much as 8% by weight of fines back to the screened feed, tests indicated that the feed mixtures flowed satisfactorily through the prototype gravitational feeders.

The next determination was that a mouse would eat with his tongue by reaching inside a screen having openings of 3/32nds of an inch, picking up the particles and rapidly returning them to his mouth. It was also noted that the mouse raises his head slightly from time to time, pauses and resumes feeding.

Figure 1:
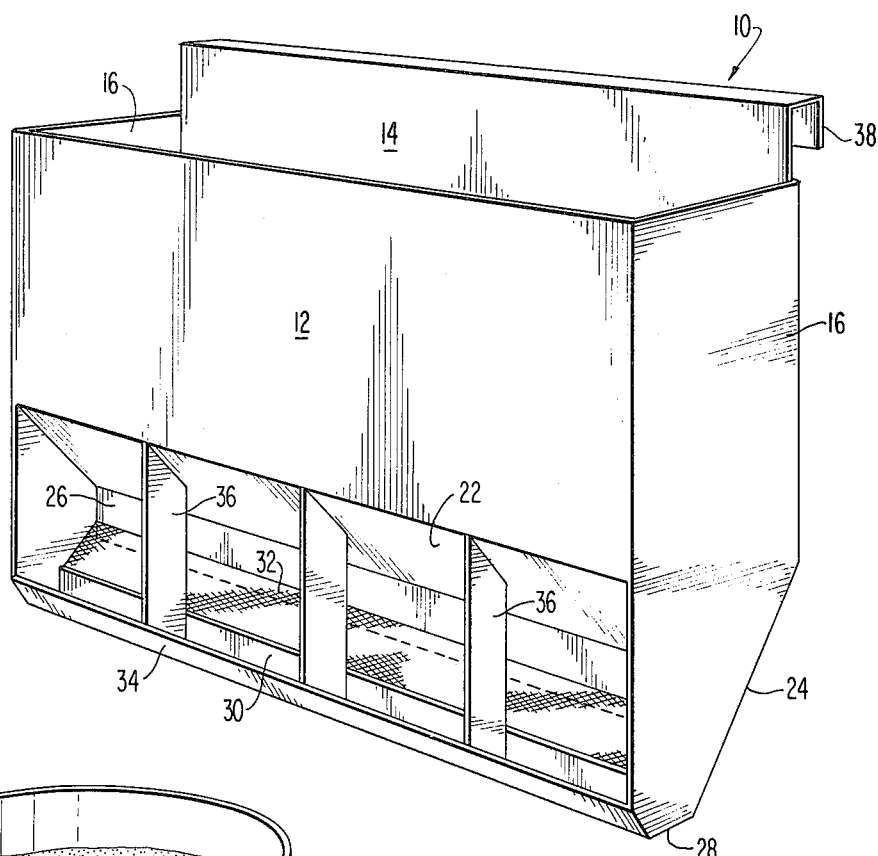
FIG. 1 is a perspective view of one embodiment of a substantially rectangular feeder which is designed to hang from the side of an animal cage.
Figures 3, 4:
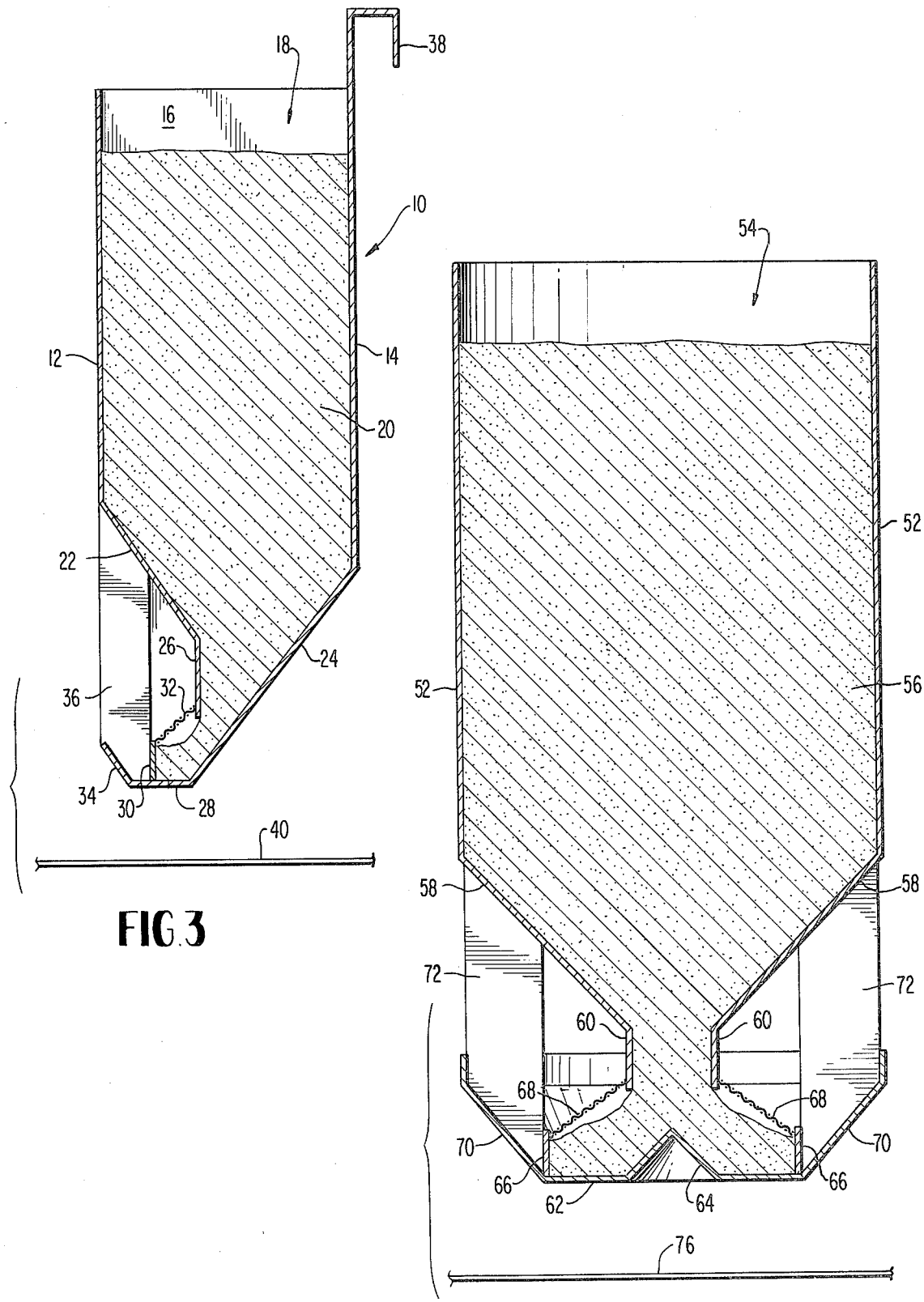
FIG. 3 is a cross-sectional view of the feeder shown in FIG. 1.
FIG. 4 is a cross-sectional view of the feeder shown in FIG. 2.

Referring now to FIGS. 1 and 3, there is shown a substantially rectangular feeder constructed in accordance with the design criteria discussed hereinabove. The feeder 10 comprises a substantially vertical front wall 12 and a substantially vertical rear wall 14. The front wall 12 and the rear wall 14, in conjunction with the spaced apart side walls 16, form a substantially rectangular feed chamber 18 which is capable of holding a quantity of animal feed 20. Downwardly convergently angled guide walls 22 and 24 are attached to the front wall 12 and the rear wall 14, respectively, in such a manner as to define an outlet for gravitationally flowing the feed 20 therethrough in a non-bridging manner. To enhance the non-bridging flow of the feed, it is preferable that the slope of the guide walls 22 and 24 is not less than 45° from the horizontal.

A substantially vertical extension wall 26 of the guide wall 22 and a substantially horizontal extension wall 28 of guide wall 24 form a feed trough for receiving a small portion of the feed 20 from the feed chamber 18. The feed trough also comprises a substantially vertical side wall 30 which extends upwardly from extension wall 28 a distance which is substantially equal to the distance of the gap between extension wall 26 and extension wall 28. The side wall 30 is positioned in a vertical plane which is substantially an equidistance from the planes defined by the front wall 12 and the extension wall 26, so as to define an animal access opening.

An immovable screen 32 is mounted above the access opening between the upper portion of the side wall 30 and the lower portion of the extension wall 28. The openings in the wire screen 32 are large enough to permit the tongue of the animal access to the feed in the trough. Preferably, the screen 32 should have openings of 3/32nds of an inch and be positioned 1/16th of an inch to 3/32nds of an inch above the level of the feed contained in the trough.

To prevent the animal from defecating or urinating into the feed contained in the trough, a deflector plate 40 or shield 34 may be utilized. The deflector plate 34 extends outward and upward from the lower portion of the side wall 30 to a point which lies in the plane defined by the front wall 12. This design ensures that the animal cannot get anything more than its head over the screen 32. Vertical support plates 36 connect the deflector plate 34 to the guide wall 22.

To conserve floor space in the animal cage, it is imperative that the feeder be hung above the floor 40 of the cage. To accomplish this result, the instant invention utilizes an L-shaped plate 38 which is attached to the upper portion of rear wall 14. The L-shaped plate 38 and the rear wall 14 of the feeder form a U-shaped channel for interlocking with the upper portion of the side wall of the animal cage. In this regard it should be noted that any other suitable mounting means, such as hooks, may be employed.

Figure 2:
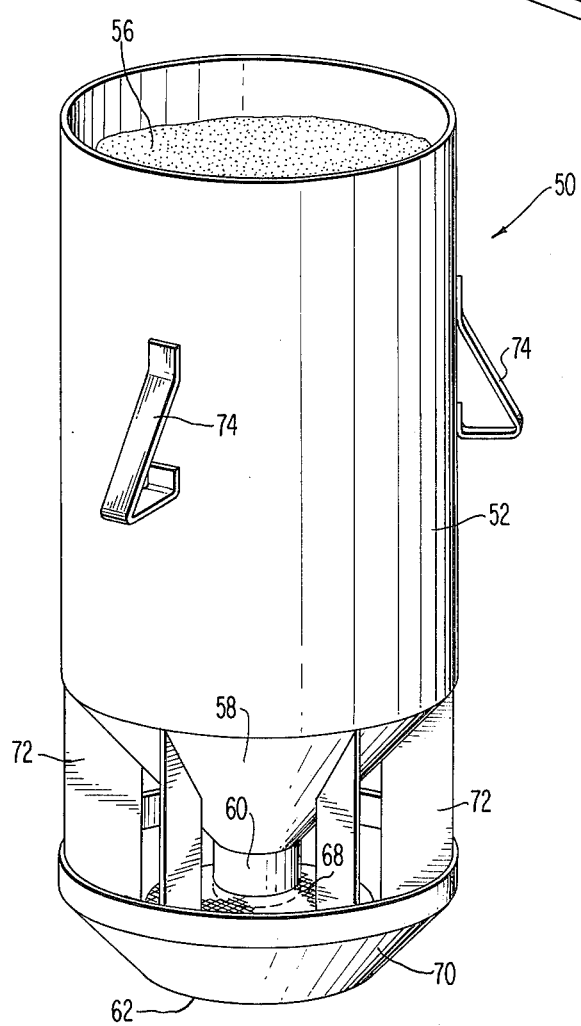
FIG. 2 is a perspective view of one embodiment of a cylindrical feeder which is designed to hang through a hole in the top of an animal cage.

Referring now to FIGS. 2 and 4, there is shown a cylindrical feeder constructed in accordance with the design criteria mentioned hereinabove. The feeder 50 comprises a cylindrical outer wall 52 which defines a cylindrical feed chamber 54 capable of holding animal feed 56. The large diameter end of an open-ended cone member 58 is attached to the lower portion of the cylindrical outer wall 52. The small diameter open end of cone 58 is attached to a cylindrical throat 60 which forms a feed outlet.

A feed pan 62 is positioned directly below the outlet, which is defined by the throat 60, for receiving a small portion of the feed 56 from the feed chamber 54. Even distribution of the feed may be enhanced by the provision of a cone-shaped depression 64 in the center of the feed pan 62. More particularly, the feed pan 62 also comprises a substantially vertical side wall 66 which extends upward a distance substantially equal to the distance of the gap between the cylindrical throat 60 and the feed pan 62. The side wall 66 is positioned in a vertical plane which is substantially an equidistance from the planes defined by the vertical walls of the feed chamber 52 and the cylindrical throat 60, so as to form an animal access opening.

An immovable screen 68, a deflector plate 70 and support plates 72, similar to those utilized in the rectangular feeder are also included. The purpose of these features being to make it impossible for the animal to defecate or urinate into the feed and to allow the feed which might drop from the mouth of the animal to fall back into the pan 62.

Unlike the rectangular feeder, the cylindrical feeder is designed primarily for mounting above the floor 76 of the cage through a hole in the top thereof. To accomplish this result, the cylindrical feeder 50 is provided with substantially V-shaped protrusions 74 which extend substantially perpendicularly outward from the surface of the cylindrical outer wall 52 of the feed chamber 54. The V-shaped protrusions 74 are designed to engage the top of the cage as the feeder 50 is lowered through a hole therein.

In operation, animal feed is supplied to the feed chamber of either device with a small portion thereof flowing into the trough or pan. As the animal eats the feed, the portion removed from the trough or pan is replaced by the gravitational flow of an equal quantity stored in the feed chamber. The inherent advantage of the present feed system is the fact that an accurate determination can be made of the food consumed. This permits calculation of the dose of a chemical fed to the animal in the food. The non-contamination of the uneaten feed is also important because research results can be influenced greatly by the repeated ingestion of the test chemical and/or its metabolites. Because the animal is unable to get more than his head over the screen portion of the trough, he cannot defecate or urinate into the feed. Furthermore, any food particles which drop from the animal's mouth will fall back into the pan and be eaten.

It is to be understood that the feeder may be constructed of metal or any other suitable material. Moreover, the immovable screen may be manufactured out of stainless steel or any other similar material.

The foregoing description of the specific embodiments will so fully reveal the general nature of the invention that others can, by applying current knowledge, readily modify such specific embodiments and/or adapt them for various applications without departing from the generic concept, and therefore such adaptations and modifications should and are comprehended within the meaning and range of equivalents of the disclosed embodiments. Further, it is to be understood that the phraseology and terminology employed herein is for the purposes of description and not of limitation.

What we claim is:

1. A feed hopper for the cage of an experimental animal, comprising:

chamber means for holding a quantity of the feed, said chamber means having chamber wall means and downwardly convergently angled guide wall means attached to the bottom of said chamber wall means;

outlet means defined by said convergently angled guide wall means for allowing the feed to gravitationally flow therethrough in a non-bridging manner;

trough means positioned a predetermined distance below said outlet means for receiving a small portion of the feed from said chamber means, said trough means having a substantially vertical side wall means positioned a predetermined distance from said outlet means, the space between said side wall means and said outlet means defining an animal access opening;

screen means immovably mounted above said animal access opening, the positioning of said screen means and said predetermined distances being selected such that said screen means is positioned above and out of contact with the level of the feed a distance sufficient to allow access to the feed of the tongue of the animal only, when the chamber has feed therein, thereby substantially preventing spillage; and shield means connected to the lower portion of said side wall means for preventing the animal from getting anything other than the head thereof over said screen means thereby preventing defecation and urination into the feed.

2. The feed hopper of claim 1 further comprising mounting means attached to said chamber wall means for mounting the hopper on the cage.

3. The hopper of claim 1 wherein said chamber means is substantially rectangular in shape.

4. The hopper of claim 3 wherein said trough means is substantially rectangular in shape.

5. The hopper of claim 1 wherein said chamber means is substantially cylindrical in shape.

6. The hopper of claim 5 wherein said trough means is a circular pan.

7. A hopper in accordance with claim 5 wherein said chamber means, said outlet means, said trough means, said screen means and said shield means are all substantially symmetrical about the axis of said cylinder.

8. The hopper of claim 1 wherein said screen means is a wire mesh screen having openings of 3/32nds of an inch.

9. The hopper of claim 8, wherein said wire mesh screen is stainless steel.

10. The hopper of claim 1 wherein said angle of said guide wall means is not less than 45° from the horizontal.

11. A hopper in accordance with claim 1 wherein the positioning of said screen means, and said predetermined distances are selected such that said screen means is positioned from 1/16 inch to 3/32 inch above the level of the feed when said chamber means has feed therein.

12. A hopper in accordance with claim 1 wherein said shield means comprises a wall extending outwardly and upwardly from the lower portion of said side wall means.

* * * * *